(12) United States Patent
Vermoesen et al.

(10) Patent No.: US 6,516,705 B2
(45) Date of Patent: Feb. 11, 2003

(54) VEHICLE BRAKE BOOSTER WITH TWO-PART AIR VALVE AND METHOD OF ASSEMBLING

(75) Inventors: Michel M. Vermoesen, Pittsfield, MA (US); Timothy A. Haerr, Enon, OH (US); Gary C. Fulks, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/795,273

(22) Filed: Feb. 27, 2001

(65) Prior Publication Data

US 2001/0052285 A1 Dec. 20, 2001

Related U.S. Application Data

(60) Provisional application No. 60/186,271, filed on Mar. 1, 2000.

(51) Int. Cl.[7] .................................................. F15B 9/10
(52) U.S. Cl. ........................ 91/377; 91/376 R; 92/140
(58) Field of Search ............................. 91/376 R, 377, 91/369.2; 60/582; 92/129, 140

(56) References Cited

U.S. PATENT DOCUMENTS

| 4,192,220 | A | * | 3/1980 | Takeoka ................... 91/376 R |
| 4,259,893 | A | * | 4/1981 | Ando et al. ............... 91/376 R |
| 5,558,001 | A | * | 9/1996 | Osaka et al. .............. 91/376 R |
| 5,794,506 | A | * | 8/1998 | Inoue et al. ............... 91/369.2 |
| 5,819,633 | A | * | 10/1998 | Satoh ........................ 91/369.2 |
| 6,192,783 | B1 | * | 2/2001 | Tobisawa ................... 91/369.2 |

* cited by examiner

Primary Examiner—Edward K. Look
Assistant Examiner—Thomas E. Lazo
(74) Attorney, Agent, or Firm—Scott A. McBain

(57) ABSTRACT

An air valve assembly is provided for a power piston in a vacuum brake booster including an input element with a hollow axial extension. The hollow axial extension includes a retaining portion. An output element is provided that includes an input extension slidably positioned within the hollow axial extension. The input extension includes an outer groove formed thereon and a ring member is disposed in the outer groove, the ring positioned adjacent the retaining portion to prevent separation of the input element and outer element.

20 Claims, 2 Drawing Sheets

VEHICLE BRAKE BOOSTER WITH TWO-PART AIR VALVE AND METHOD OF ASSEMBLING

RELATED APPLICATIONS

This application claims the benefit of U.S. Provisional Application No. 60/186,271, filed Mar. 1, 2000.

TECHNICAL FIELD

The present invention and is related to power brake boosters of the differential pressure type. In particular, the power brake booster of the present invention includes a simplified mechanical panic assist air valve assembly and a method of assembling such an air valve.

BACKGROUND OF THE INVENTION

Power brake boosters of the differential pressure type using engine vacuum are well known in the motor vehicle industry. A brake booster of this type has a diaphragm separating a vacuum chamber open to a source of vacuum, such as created in an engine intake passage, and a working chamber normally provided with vacuum or atmospheric air by a valve apparatus responsive to input brake pedal actuation to provide brake assist force as required through a power piston fixed to the diaphragm and coupled to the booster output.

The valve apparatus in a standard vacuum booster is a double or bipartite valve arrangement. The valve may have a vacuum valve seat on the power piston that is engageable with a floating control valve as well as an air valve that also has a seat engageable with the same side of the floating control valve and is coupled to a brake input rod. In the rest position (no brake apply) the air valve is engaged with the floating control valve, and the vacuum valve is slightly separated therefrom to guarantee vacuum on both sides of the diaphragm and thus no brake boost assist. A brake input to the air valve moves the air valve seat axially past the vacuum valve seat, whereupon the floating control valve moves against the vacuum valve seat to shut off the flow of vacuum into the working chamber and allow the air valve seat to disengage and admit air at atmospheric pressure into the working chamber. The increase in air pressure in the working chamber produces a differential pressure across the diaphragm to move it axially; and the power piston moves with it to provide an assist force to the brake fluid in the master cylinder. Movement of the power piston allows the floating control valve to move toward the air valve seat; and the level of boost assist is thus matched to the driver's input force. The opening of the air valve is calibrated to provide smooth brake apply in normal and typical driving situations.

Occasionally a driver may wish or need to stop the vehicle as quickly as possible. In such a situation, it might be possible to provide quicker brake application by admitting air into the working chamber of the brake booster at a faster rate. But this faster air admittance should not be provided except in such situations, since it would not produce appropriate braking behavior in normal driving. Linear solenoid and rotary motors have been used beneficially to provide dual rate actuation and control of brake boosters. However, the significant complexity of these systems can be a disadvantage in cost and reliability terms. Other brake boosters have been disclosed with the capability to provide a dual reaction ratio as a function of the input force using a dual rate spring-biased double valve. When the input force exceeds a predetermined force, the spring biasing force acting on the double valve is exceeded resulting in a collapse of the valve. Thus, this collapse causes an increased opening through the air valve seat providing a greater rate of airflow therethrough than during normal operation of the valve. The output gain of the booster is accordingly provided at an increased amount.

However, the attachment feature of the input and output portions of a prior art two-part valve can have some disadvantages. The attachment feature can be a screw attachment. There exists a potential for the screw attachment to unscrew, which affects the dimensional stack height of the valve and the function thereof and thus, the reliability of the valve. The attachment can be a pin. The integrity of the attachment and the alignment thereof can be compromised by an improper joining of the two-part valve as a result of a cross-threaded join of the two parts, or improper alignment before or after pinning or the like.

It would therefore be advantageous to provide a simple means for providing an input and an output portion of a valve for a brake booster using a minimum of robust parts that reduce or eliminate component misalignment and improper stack height in a reliable assembly that is easy to assemble.

SUMMARY OF THE INVENTION

The present apparatus provides a braking speed of application enhancement by increasing the air valve opening in a vacuum brake booster when a vehicle operator applies braking force quickly and forcefully. This is accomplished with a two-part air valve which is normally expanded axially to a normal length by an internal spring, but which may be shortened to open air valve by a greater amount when the brake pedal input force is sufficient to move the air valve axially against another spring into contact with a shoulder of the power piston. The internal spring has a much higher preload than the other spring so that the booster operates with a fully axially expanded air valve in normal, low force brake activation. Once the air valve axially engages the power piston, however, the increase in air valve opening is immediate and substantial with any further increase in braking force.

One aspect of the present invention provides an air valve assembly for a power piston in a vacuum brake booster including an input element with a hollow axial extension. The hollow axial extension includes a retaining portion. An output element is provided that includes an input extension slidably positioned within the hollow axial extension. The input extension includes an outer groove formed thereon and a ring member is disposed in the outer groove, the ring member positioned adjacent the retaining portion to prevent separation of the input element and outer element.

Another aspect of the present invention provides an assembly wherein the ring member extends outwardly from the outer groove to engage the retaining portion. The ring member can be a circlip.

The retaining portion of the input element can include an inwardly extending notch positioned at an open axial end of the hollow axial extension, an inwardly extending radial retention surface, an inwardly extending catch and an internal groove.

The groove can allow the clip to move axially with respect to the hollow axial extension. The hollow axial extension can include an open axial end. The open axial end can include a plurality of axial slots formed therein, the slots allowing portions of the open axial end defined thereby to be spread apart. The open axial end can include four slots formed in the open axial end. The open axial end can include a beveled surface to guide insertion of the input extension.

Other aspects of the present invention can include a flange formed on the input element. The flange includes a shoulder portion. A spring seat portion is formed on the output element and a spring is disposed between the flange and the spring seat to bias the input element and the output element apart from each other. The spring is provided with a predetermined load resistance above which the air valve assembly collapses by allowing the input element and output element to move axially toward each other. The valve assembly can include a pair of springs, the pair of springs compressing at different predetermined loads.

Another aspect of the present invention provides a method of assembling an air valve for a vacuum brake power booster. The air valve includes an input element and an output element. The method includes retaining a clip on an input extension of the output element. An axial extension of the input element is spread over the clip. The input extension of the output element is inserted into the axial extension of the input element and the input extension is retained to the axial extension. A spring is provided between the input member and the output member before the input extension is inserted into the axial extension.

Another aspect of the invention provides a vacuum brake power booster assembly including an air valve including a means for retaining a clip on an input extension of an output element of the air valve, a means for spreading an axial extension of an input element of the air valve over the clip, a means for inserting the input extension of the output element into the axial extension of the input element and a means for retaining the input extension to the axial extension. The assembly can further include a means for biasing apart the input element and output element. The biasing means compresses at a predetermined apply force to permit collapse of the air valve.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
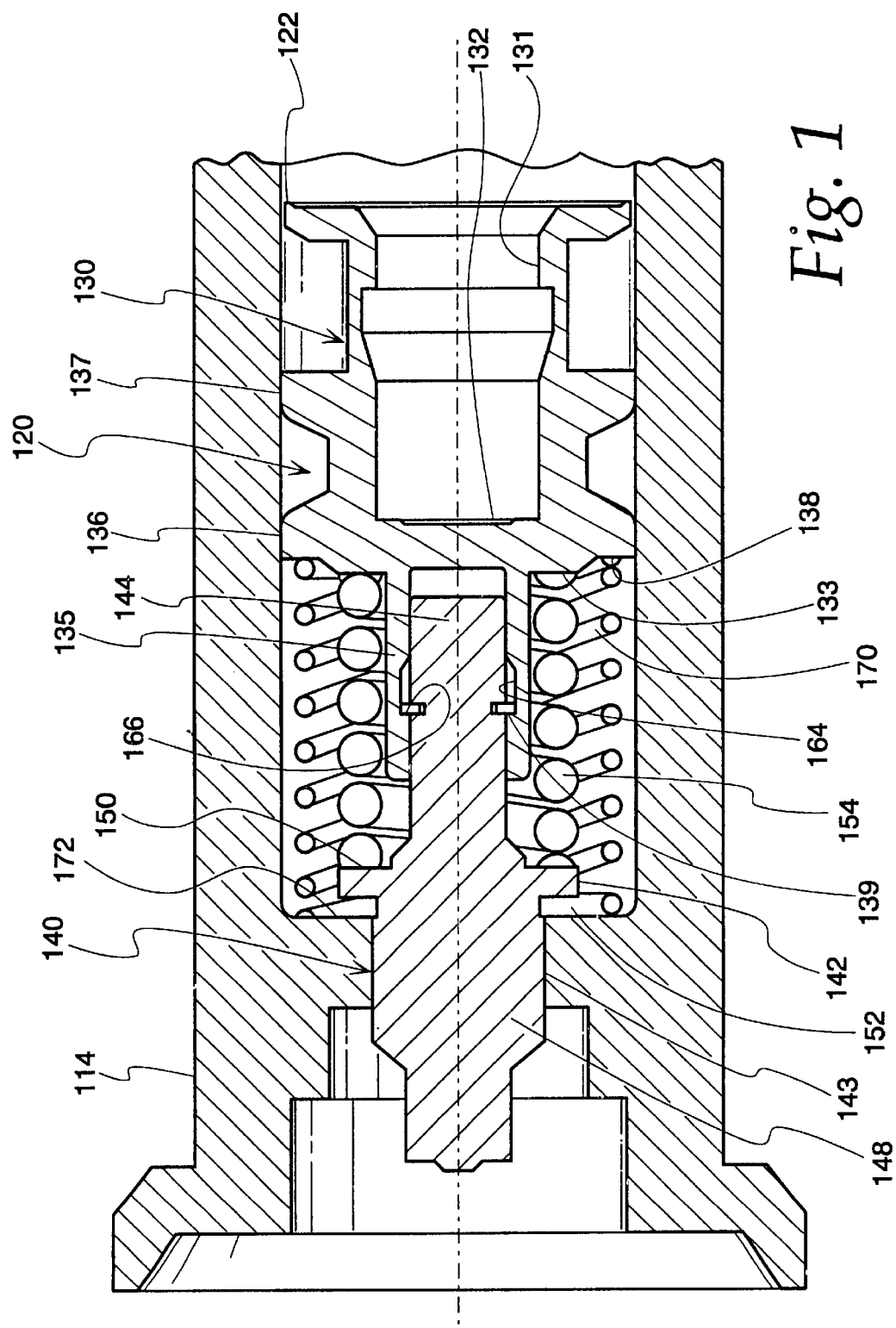
FIG. 1 illustrates a section view of one embodiment of the air valve assembly for a brake booster.

This apparatus shows a "drop-in" replacement air valve assembly for a standard vacuum brake booster to provide a braking speed of application enhancement described above. Referring to FIG. 1, air valve assembly 120 comprises two main parts: air valve input element 130 and air valve output element 140. Each of these parts may be made of a metal, plastic or other suitable material.

Air valve seat input element 130 can be provided with an axially raised rim 122 comprising an air valve seat at the input (right, in FIG. 1) end 131 thereof, rim 122 being engageable with the floating control valve, (not shown), in the normal manner. Rim 122 can also define an opening for a deeply concave receptacle 132 in input end 131 adapted to receive an input rod, (not shown), that transfers input brake force from a brake pedal axially to air valve input element 130 in the normal manner. Air valve input element 130 also can define a shoulder 133, which forms a spring seat facing in the output direction, away from input end 131. Between air valve seat 122 and shoulder 133 a pair of annular flanges 136, 137 can project radially outward from axial end 131 of air valve input member 130 with outer cylindrical surfaces for supporting axial end 131 of air valve input element 130 within a power piston 114. A spring seat 138 can be also defined on annular flange 136 facing in the output direction, spring seat 138 being located radially outward from shoulder 133.

Figure 2:
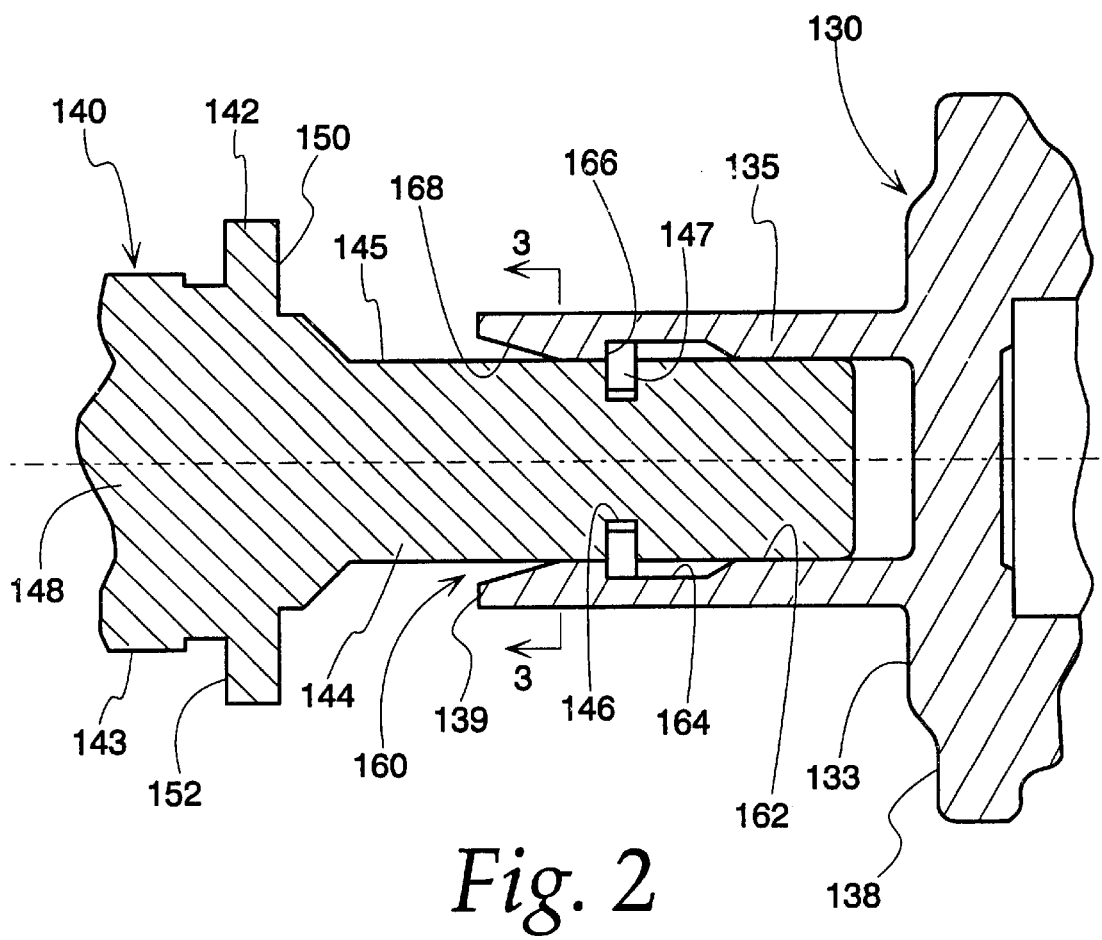
FIG. 2 is an enlargement of FIG. 1.

Air valve input element 130 also can include an axial extension 135 extending in the output direction (left in FIG. 1) from shoulder 133 and having a reduced outer diameter compared with axial end 131. Output extension 135 can be essentially tubular in shape and has an open axial end 139 and an essentially cylindrical internal surface 162 provided with an axially extending, circumferential notch or groove 164. As seen most clearly in FIG. 2, which is an enlarged view of a portion of FIG. 1, notch 164 defines adjacent end 139, a retention surface 166, comprising an annular portion of essentially radial plane; and a portion 168 of internal surface 162 adjacent output end 139 of output extension 135 is tapered as shown. It will be understood that the retention surface 166 can be provided on any feature suitable for retaining a cooperating feature provided on the output member. In other words, the surface 166 can be a portion of a channel, notch, groove, tooth, flange or catch, or the like which includes an effective retaining, substantially radial surface.

Figure 3:
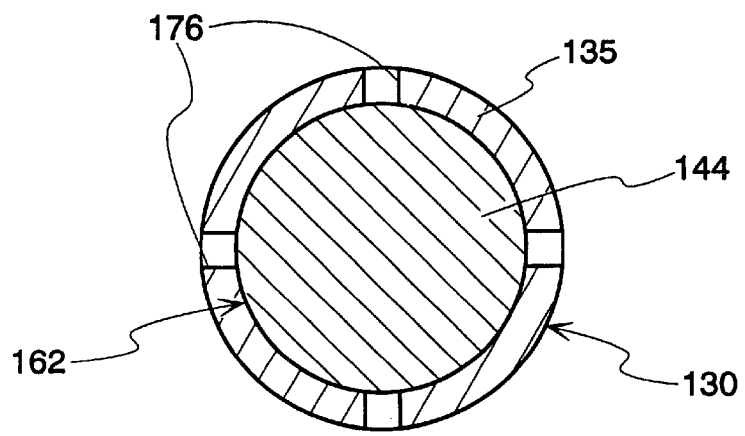
FIG. 3 is a section view along lines 3—3 of FIG. 2.

As shown in FIG. 3, one or more axial slots 176 are provided in output extension 135 from output end 139 inward to separate a substantial portion of output extension 135 from output end 139 inward into a plurality of tangs facilitating limited, resilient outward spreading or expansion of output end 139.

Air valve output element 140 can include a radially extending flange 142 that provides an axial spring seat 150 on the input (right, in the figure) side thereof and a stop 152 on the output (left) side thereof. On the output end of flange 142, a plunger portion 148 has an outer cylindrical supporting surface 143. On the input side of flange 142 is an input extension 144 having an outer cylindrical surface 145 and adapted for insertion within output extension 135 of air valve input element 130. A circumferential groove 146 contains a retention ring 147, a portion of which extends radially outward from groove 146 beyond surface 145. The ring can be a circlip, or the like, that cooperates with surface 166 to retain the output member input extension 148 within axial extension 135. It should also be noted that extension 148 is slidable with respect to extension 135 even after the ring or clip 147 is engaged by surface 166. The axial length of groove 164 allows the ring 147 to reciprocate within groove 164, and thus the output member with respect to the input member. Also, a portion of the length of extension 144 may contact the input element 130 and prevent further collapse of the valve assembly 120.

To assemble air valve assembly 120, a compression spring 154 is inserted over axial extension 135 of air valve input member 130 abutting shoulder 133. Retention ring 147 is seated in groove 146. Input extension 144 is axially inserted into axial opening 160 of air valve input element 130. As air valve element 130 and 140 are moved toward each other during insertion, spring 154 is compressed between shoulder 133 of air valve input element 130 and spring seat 150 on flange 142 of air valve output element 140 to exert a separating bias between the elements 130, 140. In addition, the tangs of output end 139 (defined by slots 176) are pushed radially and resiliently outwardly by retention ring 147 until the latter passes retention surface 166 of notch 164. At this point, the tangs of end 139 are no longer pushed outward and resiliently return inward. The insertion force is withdrawn, and the separate bias exerted by spring 154 between air valve input element 130 and air valve output element 140 causes axial expansion of air valve assembly 120 to the maximum axial length permitted by retention ring 147 locked in groove 146 and engaging retention surface 166 of notch 164. Air valve assembly 120 can be then installed in the power piston 114 with an air valve spring 170 compressed between spring seat 138 on air valve input element of air valve assembly 120 and the cooperating spring seat on a shoulder 172 in the power piston to bias air valve assembly 120 in the input direction.

In braking operation, if normal braking forces are applied to air valve assembly 120 by the vehicle operator, the relatively greater strength of compression spring 154 keeps air valve elements 130 and 140 fully separated in a constant axial relationship; and normal brake booster operation results. But if a large, sudden braking force is applied to air valve assembly 120 sufficient to engage stop 152 on the output face of flange 142 with shoulder 172 of power piston 114, compression spring 154 is temporarily compressed to allow air valve input element 130 to move axially toward air valve output element 140. It will be understood that the spring 154 will compress at a predetermined force that coincides to a panic apply force. Since air valve seat 122 is carried on air valve input element 130, it provides a greater than normal opening relative to the floating control valve, which is limited in leftward movement by power piston 114, for airflow into the booster working chamber. This results in faster booster response and quicker increase in braking force at the wheels.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An air valve assembly for a power piston in a vacuum brake booster comprising:
   an input element including a hollow axial extension, the hollow axial extension including a retaining portion;
   an output element including an input extension slidably positioned within the hollow axial extension, the input extension including an outer groove formed therein;
   a spring disposed between the input element and the power piston and engaged with the power piston; and
   a ring member disposed in the outer groove, the ring member positioned adjacent the retaining portion to prevent separation of the input element and output element.

2. The assembly of claim 1 wherein the ring member extends outwardly from the outer groove to engage the retaining portion.

3. The assembly of claim 2 wherein the retaining portion of the input element includes an inwardly extending notch positioned adjacent an open axial end of the hollow axial extension.

4. The assembly of claim 2 wherein the retaining portion of the input element includes an inwardly extending radial retention surface.

5. The assembly of claim 2 wherein the retaining portion of the input element includes an inwardly extending catch.

6. The assembly of claim 2 wherein the retaining portion of the input element includes an internal groove.

7. The assembly of claim 6 wherein the groove allows the ring member to move axially with respect to the hollow axial extension.

8. The assembly of claim 1 wherein the ring member is a circlip.

9. The assembly of claim 1 wherein the hollow axial extension includes an open axial end.

10. The assembly of claim 9 wherein the open axial end includes a plurality of axial slots formed therein, the slots allowing portions of the open axial end defined thereby to be spread apart.

11. The assembly of claim 10 including four slots formed in the open axial end.

12. The assembly of claim 10 wherein the open axial end includes a beveled surface to guide insertion of the input extension.

13. The assembly of claim 1 further comprising:
   a flange formed on the input element, the flange including a shoulder portion;
   a spring seat portion formed on the output element; and
   a second spring disposed between the flange and the spring seat to bias the input element and the output element apart from each other.

14. The assembly of claim 13 wherein the second spring is provided with a predetermined load resistance above which the air valve assembly collapses by allowing the input element and output element to move axially toward each other.

15. A method of assembling an air valve for a vacuum brake power booster, the air valve including an input element and an output element comprising:

retaining a clip on an input extension of the output element;

spreading an axial extension of the input element over the clip;

inserting the input extension of the output element into the axial extension of the input element; and retaining the input extension to the axial extension.

16. The method of claim 15 further comprising:

providing a spring between the input element and the output element before the input extension is inserted into the axial extension.

17. A vacuum brake power booster assembly including an air valve comprising:

means for allowing spreading of an axial extension of an input element;

means for allowing insertion of an input extension of an output element into the axial extension of the input element; and means for retaining the input extension to the axial extension.

18. The assembly of claim 17 further comprising:

means for biasing apart the input element and output element.

19. The assembly of claim 18 wherein the biasing means compresses at a predetermined apply force to permit collapse of the air valve.

20. An air valve assembly for a power piston in a vacuum brake booster comprising:

an input element including a hollow axial extension, the hollow axial extension including a retaining portion and an open axial end, the open axial end including a plurality of axial slots formed therein, the slots allowing portions of the open axial end defined thereby to be spread apart;

an output element including an input extension slidably positioned within the hollow axial extension, the input extension including an outer groove formed therein; and a ring member disposed in the outer groove, the ring member positioned adjacent the retaining portion to prevent separation of the input element and output element.

* * * * *